Patented Oct. 14, 1930

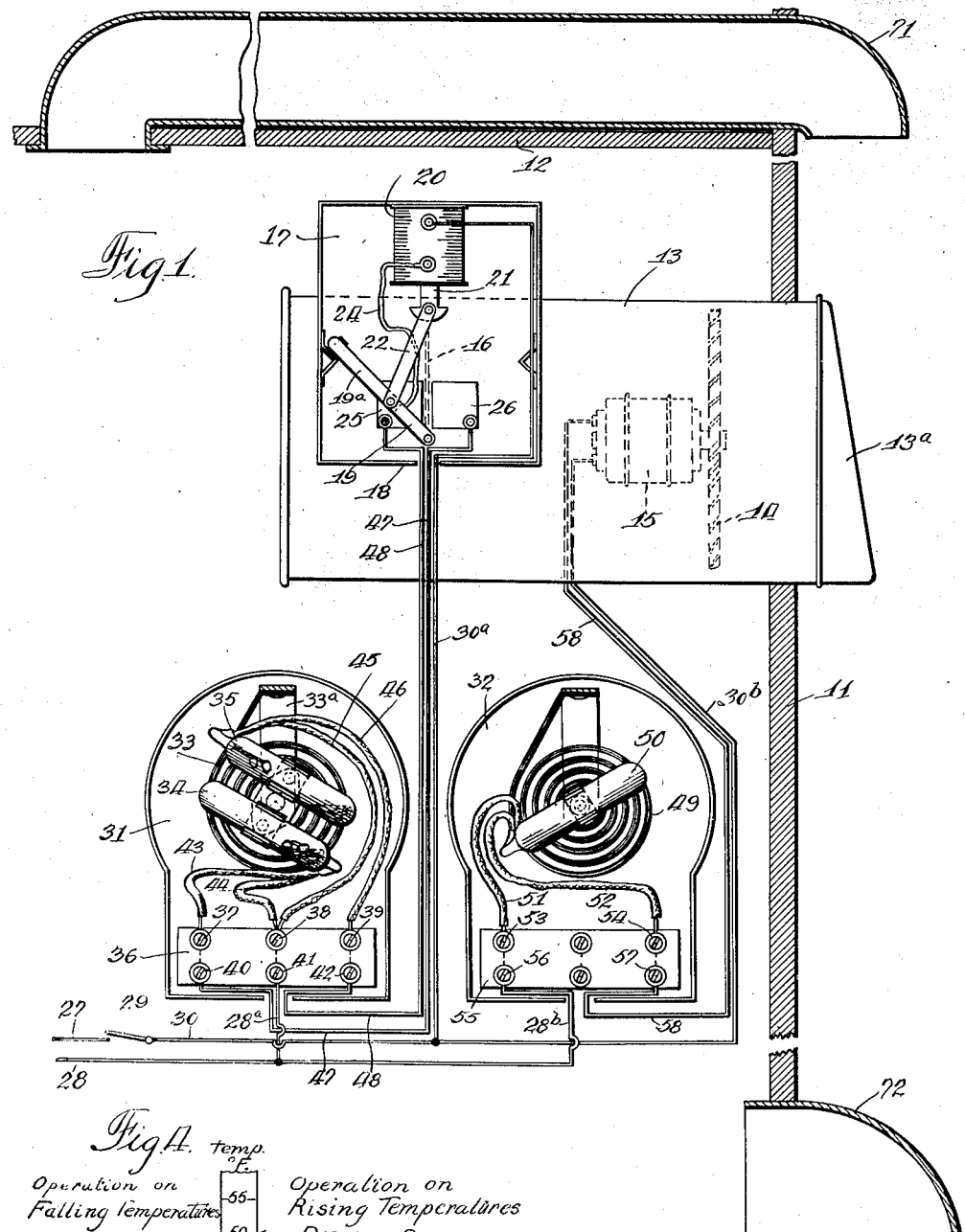

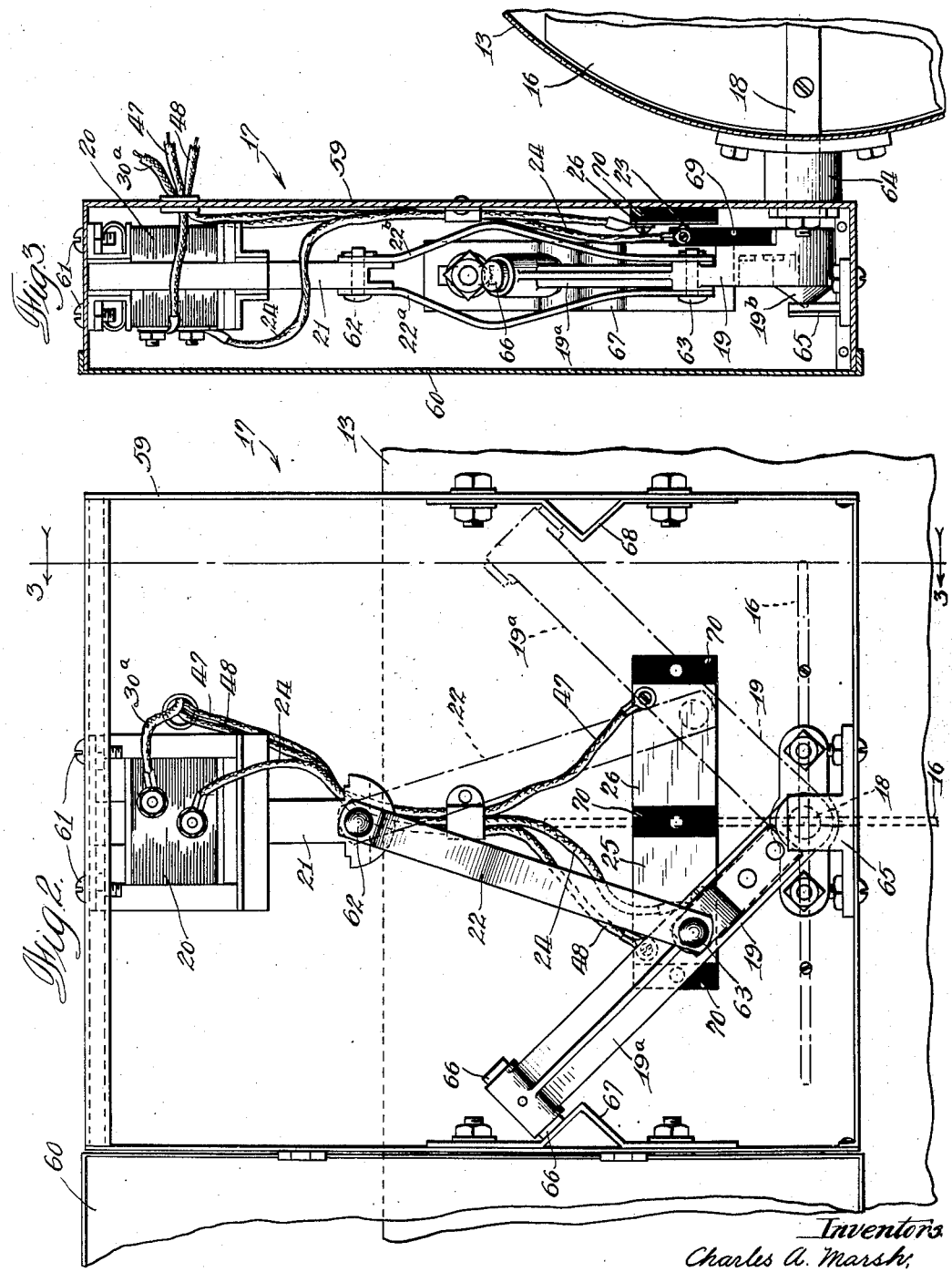

1,778,560

UNITED STATES PATENT OFFICE

CHARLES A. MARSH, JAMES L. STRAHAN, AND ALBERT H. NELLER, OF FAIRFIELD, IOWA, ASSIGNORS TO THE LOUDEN MACHINERY COMPANY, OF FAIRFIELD, IOWA, A CORPORATION OF IOWA

VENTILATING SYSTEM AND APPARATUS

Application filed November 29, 1929. Serial No. 410,630.

This invention relates to improvements in ventilating systems and apparatus, and has particular relation to the ventilation of barns and other animal shelter buildings.

The primary object of the invention is to provide a ventilating system and apparatus for the above-indicated use in which the natural biological heat produced by the animals housed in the building is utilized to regulate the temperature and humidity conditions within the building.

Another object of the invention is to provide a system of the above-indicated character, including automatic control means whereby the best obtainable conditions are maintained without requiring personal supervision or the exercise of manual control.

A further object of the invention is to provide a system of the above-indicated character which will operate to prevent the condensation of atmospheric moisture in the building and in the ventilating ducts or flues.

It is a further object of the invention to provide a system and apparatus which will accomplish all of the above-indicated objects in an efficient and reliable manner, and which will nevertheless be simple and economical to install and to operate.

In the ventilation of buildings utilized for the housing of livestock and the like it is desirable to maintain as nearly as possible uniform conditions of temperature and humidity. The present invention contemplates the control of a ventilating system for the purpose specified by closely and automatically relating the rate of air flow through the ventilated building or room to the temperature of the air in such manner as to restrict the flow as the temperature falls. This mode of operation is consistent with the maintaining of proper humidity conditions, as a reduced flow of air during cold weather will have the same effect in humidity regulation as a greater flow in warmer weather. In other words, a given volume of cold air warmed through a wide temperature range will absorb as much moisture as a larger volume of comparatively warm air heated through a smaller range. Thus the regulation of air flow in the manner contemplated by the present invention operates to maintain both temperature and humidity conditions within the desired ranges.

Other objects and advantages of the invention will appear from a consideration of the following detailed description in conjunction with the accompanying drawings, in which Figure 1 is a diagrammatic view, partly in elevation and partly in section, of certain apparatus constituting a ventilating system designed in accordance with the present invention;

Fig. 2 is a front elevational view of a damper operating mechanism which is shown diagrammatically in Fig. 1, this mechanism being housed in a casing having a door shown in part in open position;

Fig. 3 is a view partly in side elevation and partly in vertical sections, taken on the line 3—3 of Fig. 2; and Fig. 4 is a chart or diagram illustrating a typical cycle of operation of the ventlating system herein disclosed.

Referring first to Fig. 1 of the drawings, the ventilating system is shown as being associated with a building or room having an outside wall 11 and a ceiling 12. A ventilating duct or flue 13 extends through the wall 11 and terminates a short distance beyond said wall where it may be provided with any suitable or desired form of shutter mechanism or the like for protection of the apparatus against the weather. Such mechanism is well known in the art and is not shown in detail herein, but it will be understood that it may be embodied in the outer end of the ventilating duct or flue 13 at the position indicated by the reference character 13ª.

A ventilating fan 14 is disposed within the duct or flue 13 and is provided with an electric motor 15 for driving the same. The duct or flue 13 is also provided with a damper 16 located inwardly from the fan 14, and adapted to occupy either the position illustrated in Fig. 1, in which the flow of air through the ventilating duct is reduced in proportion to the area of the duct which is obstructed by the damper in this position, or a position at right-angles to that shown in Fig. 1, in which latter position the flow of air is substantially unobstructed by the damper.

The operation of the damper 16 is controlled by mechanism generally designated by the reference character 17 and shown diagrammatically in Fig. 1. This mechanism essentially comprises a shaft or spindle 18 extending transversely through the duct or flue 13 and suitably journaled in the side walls of said duct or flue. The damper 16 is rigidly secured to the shaft 18 within the duct or flue 13, and the forward extremity of the shaft 18, as viewed in Fig. 1, projects forwardly a sufficient distance to accommodate the mounting thereon of a lever arm 19. This lever arm is preferably secured to the shaft 18 at an angle of substantially 45° from the plane of the damper 16 and is adapted to be actuated between two operative positions. One of these positions is illustrated in Fig. 1, in which the lever arm 19 is located substantially 45° to the left of the upper vertical position, and the other operative position of such lever arm is the position substantially 45° to the right of this upper vertical position. In the latter position of the lever arm 19, which represents a rotation of the shaft 18 of substantially 90° in a clockwise direction, the damper 16 lies in a plane parallel to the axis of the duct or flue 13, and, therefore, does not materially obstruct the flow of air through said duct or flue.

The actuation of the lever arm 19 between its two operative positions as above described is preferably accomplished by means of a solenoid 20 having a core member 21. A connecting link 22 which, as will appear hereinafter, is made in the form of a clevis, is pivotally connected at its upper extremity to the bottom of the solenoid core member 21, and is similarly pivotally connected at its lower extremity to an intermediate point on the lever arm 19. The said lever arm carries an electrical contact member 23 (Fig. 3) which is connected by a flexible conductor 24 to one terminal of the solenoid coil 20. This movable contact member 23 is adapted to cooperate with two fixed insulated contact plates 25 and 26 for the purpose of controlling the energization of the solenoid 20 during the operation of the damper mechanism. It will suffice to say for the present that this contact mechanism is so arranged that energization of the solenoid coil 20 will effect actuation of the damper 16 from either of its two operative positions to the other, and that the energization of the solenoid coil is automatically interrupted while such operation is being effected. The exact mode of operation of the contact mechanism to accomplish this result will appear clearly hereinafter.

Two electrical supply wires 27 and 28 are connected to any suitable source of electrical energy (not shown) and are adapted to transmit the energy required for operating the electrical apparatus of the ventilating system to such apparatus. The conductor 27 is connected to one terminal of a switch 29 that is provided to render the system operative or inoperative at the will of the person or persons having charge of the system. A conductor 30 extends from the other terminal of the switch 29 and comprises a branch 30$^a$ extending to the terminal of the solenoid coil 20 other than that to which the flexible lead 24 is connected, as above described, and a branch 30$^b$ extending to one terminal of the electric motor 15. The other supply conductor 28 comprises a branch 28$^a$ extending to a thermostatic control device that is generally designated by the reference character 31, and a branch 28$^b$ extending to another thermostatic control device 32. The devices 31 and 32 are respectively provided for controlling the operation of the damper mechanism 17 and the electric motor 15 for driving the ventilating fan 14.

The thermostatic device 31 preferably comprises a coiled bimetallic or other thermostatic element 33 which controls the movement of two electric switches 34 and 35. These switches are of the enclosed mercury contactor type and are so mounted as to be tiltable in a vertical plane in accordance with the movement of the thermostatic element 33, in a manner well known in the art. The mounting of the switches 34 and 35 is such that the circuit through the switch 34 is closed when the containers of these switches are tilted downwardly to the right, as shown in Fig. 1, while the circuit through the contacts of the switch 35 is open under this condition. This arrangement is effected by mounting the switch 34 with its two electrodes or contacts in the right-hand extremity thereof, as viewed in Fig. 1, and the switch 35 with its two electrodes or contacts in the left-hand extremity thereof.

The characteristics of the thermostatic element 33 are such that tilting of the switches 34 and 35 is effected to open the switch 34 and to close the switch 35 when the temperature of said element reaches the upper limit of a predetermined desired temperature range, while the reverse operation is effected when the temperature reaches the lower limit of such temperature range. In this connection it will be understood that the device 31 is mounted at any suitable location in the building or room to be ventilated so that the temperatures to which said device is subjected will be representative of the conditions generally obtaining throughout the building or room. The same is true of the thermostatic device 32 which controls the fan motor 15, and it may be generally stated that the two devices 31 and 32 will be mounted adjacent each other for convenience in installation and adjustment.

It may also be noted at this point that the showing of the device 31 is in rear elevation in Fig. 1 in so far as the relative positions of the thermostatic element 33 and the switches 34 and 35 are concerned. The actual construction of the particular device which is preferably utilized is such that the switches are located behind the thermostatic element, which latter is mounted on an adjustable bracket member 33ª having a portion (not shown) projecting through the front of the casing whereby the device may be set to operate at any desired temperature. Since the details of structure and arrangement of these parts are not material to the present invention, they are shown in the manner explained for convenience and clarity of illustration. The corresponding parts of the device 32, which will be described presently, are shown in a similar manner for the same reasons.

A suitable terminal board 36 (shown in front elevation) is provided in the device 31 and carries terminals 37, 38 and 39 to which the conducting leads from the switches 34 and 35 are adapted to be connected, and terminals 40, 41 and 42 which are respectively connected to the terminals 37, 38 and 39 and are adapted to receive the conductors for connecting the switches 34 and 35 to the apparatus to be controlled thereby. To this end the switch 34 is provided with two flexible conducting leads 43 and 44 which respectively extend between the two electrodes of said switch and the terminals 37 and 38. The switch 35 is similarly provided with two flexible conducting leads 45 and 46 which respectively extend from the two electrodes of said switch 35 to the terminals 38 and 39.

It will be observed, therefore, that the terminal 38 constitutes a common terminal connected to one terminal of each of the switches 34 and 35. It is this terminal of the device 31 which is connected to the supply conductor 28, as the branch 28ª of said conductor is connected to the terminal 41 which, as above stated, is electrically connected to the terminal 38. The terminals 40 and 42, which are respectively connected to the terminals 37 and 39, are connected through conductors 47 and 48 to the fixed contact plates 26 and 25, respectively, of the damper operating mechanism 17. The circuit connections thus described constitute the complete connections for controlling the energization of the solenoid coil 20 in accordance with the operation of the switches 34 and 35, so that the operation of the damper 16 is controlled by the thermostatic element 33 of the device 31.

The thermostatic device 32 comprises a bi-metallic or other thermostatic element 49 having a single switch 50 of the enclosed mercury contactor type associated therewith. This switch 50 comprises a single pair of contacts or electrodes which are disposed in the left-hand extremity of the container of said switch, so that the circuit thereto will be completed when said switch is tilted downwardly to the left, as shown in Fig. 1, and will be interrupted when said switch is tilted downwardly to the right. The characteristics of the thermostatic element 49 are such that the circuit through the switch 50 will be maintained closed under all normal temperature conditions, but will be tilted in the opposite direction to interrupt said circuit when the temperature falls to a subnormal value. In the preferred embodiment of the present invention, this subnormal value is near the freezing point and the switch 50 is maintained closed under all conditions except when the temperature in the building or room to be ventilated is such that there is imminent danger of the freezing point being reached.

The two electrodes of the switch 50 are respectively connected through flexible conducting leads 51 and 52 to two terminals 53 and 54 that are mounted on a suitable terminal board 55 in the device 32. The terminals 53 and 54 are respectively connected to terminals 56 and 57 that are provided for the making of external circuit connections to the device, and it is the terminal 56 to which the branch 28ᵇ of the supply conductor 28 is connected. The terminal 57 is connected through a conductor 58 to that terminal of the motor 15 other than the one to which the branch conductor 30ᵇ is connected, as heretofore described. With these connections it will be seen that the circuit of the motor 15 is completed whenever the switch 50 is closed, and that, therefore, said motor is continuously energized under these conditions from the supply conductors 27 and 28, it being remembered that the switch 29 is closed except when it is desired to render the system inoperative.

Thus, the fan 14 is continuously driven by the motor 15 as long as the system is in operative condition and as long as the temperature in the building or room to be ventilated does not fall to the predetermined subnormal value at which the thermostatic element 49 effects opening of the switch 50. If such subnormal temperture is reached, the switch 50 will be opened and the motor 15 will be deenergized to discontinue the operation of the fan 14 until the temperature again rises to a safe value. It will be understood that the device 32 is so constructed that the operation of the switch 50 will lag slightly behind the movement of the thermostatic element 49 so that said switch will be closed on rising temperatures at a temperature value somewhat above that at which said switch is opened on falling temperatures. The same is true of the operation of the switches 34 and 35 of the device 31, and the significance of the operation of the devices 31 and 32 in this manner will appear more clearly hereinafter.

The details of construction of the damper operating mechanism 17 are shown more clearly in Figs. 2 and 3 of the drawings. Referring to these figures, it will be seen that the operating mechanism is enclosed in a casing 59 which may be of sheet metal or other suitable construction. A hinged door 60 is provided on the front of this casing and a portion of said door is shown in Fig. 2 in its open position. The solenoid 20 is suitably fixed within the casing by means of screws or bolts 61 which secure the frame of the solenoid to the upper wall of the casing 59. The core member 21 is suitably guided for vertical reciprocating movement within the coil 20, and the connecting link 22 is pivotally connected to the lower extremity of said core member by means of a pin 62. The heretofore-mentioned clevis formation of the link 22 is shown in Fig. 3, said link preferably consisting of two oppositely bowed members 22$^a$ and 22$^b$, between which the portion 19$^a$ of the lever arm 19 is freely movable. The two members 22$^a$ and 22$^b$ constituting the clevis-like link are pivotally connected at their lower extremities to the lever arm 19 by means of a pin 63.

The damper shaft 18 is shown as being rotatably mounted in a journal member 64 that is suitably secured to the wall of the ventilating duct 13. The damper 16 is secured to the shaft 18 within said duct and it will be noted that the surface of said damper is less than the cross-sectional area of the duct 13, so that the passage of air through said duct is only partly cut off when the damper is positioned at right-angles to the axis of the duct.

The lower extremity of the lever arm 19 is suitably secured to the forwardly projecting end of the shaft 18, and is preferably provided with a conical protruding portion 19$^b$ that is adapted to bear against a positioning member 65 secured to the bottom wall of the lever casing 59. The free extremity of the lever arm 19 carries a bumper member 66 of rubber or other suitable shock-absorbing material which projects at each side of the arm 19 to abut against angularly-bent stop members 67 and 68 that are secured to the respective side walls of the casing 59.

The movable contact member 23 is carried by an insulating member 69 that is secured to the lower portion of the lever arm 19 and said contact member is adapted to make contact with the front faces of the two conducting plates 25 and 26, depending upon the position of the arm 19. These conducting plates are mounted upon an insulating base 70 that is suitably secured to the rear wall of the casing 59. The flexible conducting lead 24 is also shown in Figs. 2 and 3 as extending from one terminal of the solenoid coil 20 to a point of connection with the movable contact member 23, and the conductor branch 30$^a$, as well as the conductors 47 and 48 which are respectively connected to the contact plates 26 and 25, shown as extending outwardly through a suitable opening in the rear wall of the casing 59.

The parts of the damper operating mechanism are shown in full lines in Figs. 2 and 3 in the same positions as those illustrated in Fig. 1, and are shown in the other operative position in dot-and-dash lines in Fig. 2. The alternate position of the damper itself is also shown in dot-and-dash lines in the latter figure, thus indicating the position occupied by the damper when the lever arm 19 is in its right-hand position.

The operation of the system and apparatus above described will now be set forth. The fan 14 is preferably driven by the motor 15 in such direction as to exhaust air from the building or room to be ventilated, thus making the duct 13 the outtake conduit of the system. Air is admitted to the building through any suitable ducts or openings, such, for example, as ducts 71 and 72 shown in Fig. 1. The positions of these ducts in relation to the outtake conduit 13 is not material to the present invention, and, therefore, the showing of Fig. 1 in this regard is to be considered as purely diagrammatic. The relative positions of the inlet and outtake conduits will be determined in any particular installation by the conditions which may be encountered and which need not be considered herein. It may be stated that several inlet conduits are usually provided in each installation and that these conduits are ordinarily disposed at desired intervals on two or more sides of the building. Such inlet conduits may be provided with any desired type of control valve or other mechanism (not shown) for preventing the admission of too much air due to wind conditions and for preventing back drafting, or they may be modified to function solely as back draft controlling units. Such a valve is shown in United States Patent No. 1,623,286, issued on April 5, 1927, to James L. Strahan and assigned to the assignee of the present invention. Since the use of these valves is not directly related to the present invention they are not shown or described herein.

In order to maintain the most desirable temperature and humidity conditions within the barn or other buildings the fan 14 is kept running at all times except when the inside temperature falls to such a value that there is danger of the freezing point being reached. This condition is maintained by the setting of the thermostatic device 32, which causes the switch 50 to remain closed to energize the fan motor 15 except under the dangerous temperature condition specified. The setting of the thermostatic device 31 is such that the damper 16 is closed when the temperature falls to the lower limit of the desired temperature range, and it is opened when the temperature rises to the upper limit of such range. The condition illustrated in Fig. 1 of the drawings is that corresponding to a temperature below the desired value but above the value which causes the motor switch 50 to be opened.

Referring to Fig. 4, it will be seen that this is the condition which will obtain when the temperature has fallen below 45° but has not reached the minimum safe value of 37°, or having fallen to the latter value has again risen above the 41° point. It will be understood that the temperature values indicated in Fig. 4 and discussed herein with reference to said figure are given purely by way of example and are not to be taken as limiting the scope of the present invention in any particular.

The differential of temperature between the point at which the damper closes on falling temperature and that at which it opens on rising temperature, and the differential between the point at which the fan stops on falling temperature and that at which it starts again on rising temperature, are merely the result of the lag between the movement of the thermostatic elements 33 and 49 and the switches that are operated thereby. It is desirable that this lag be of substantial amount so that a condition which may be referred to as "chattering" or "fluttering" of the contact devices will be avoided.

The details of construction whereby this mode of operation is effected are well known in the art and do not require elaborate discussion herein. It is sufficient to say that when mercury contactors are utilized the tilting of such contactors slightly beyond the horizontal will cause the mercury to flow to the opposite end of the containers and that the weight of the mercury will then cause a slight additional tilting of the contactors. This means that a slightly higher temperature is required to return the switches to their original positions on rising temperatures than is required to move them in the opposite direction on falling temperatures. This action may be accentuated, if desired, by providing for a slight degree of lost motion between the thermostatic actuators and the containers of the switches that are actuated thereby.

Assuming the condition illustrated in Fig. 1, and referring to the temperature values exemplified in Fig. 4, a rise in temperature to 50° will cause the switches 34 and 35 to be tilted in a direction opposite to that shown, so that the switch 34 will be opened and the switch 35 will be closed. The closing of the switch 35 completes an energizing circuit for the solenoid coil 20, which extends from the supply conductor 27 through the switch 29, the conductor 30 and the branch 30ª thereof, the coil 20, the flexible lead 24, the movable contact member 23, the contact plate 25, the conductor 48 to the terminals 42 and 39 of the thermostatic switching device 31, thence through the flexible lead 46, switch 35, flexible lead 45, terminals 38 and 41, and the branch conductor 28ª to the other supply conductor 28.

The resultant energization of the solenoid coil 20 causes the core member 21 thereof to be raised, and this movement imparts a clockwise rotation to the damper shaft 18 through the connecting link 22 and the lever arm 19. As this lever arm reaches its vertical position, constituting the "dead center" position of the magnetic actuating mechanism, the circuit of the solenoid coil 20 is broken by reason of the movable contact member 23 disengaging the contact plate 25 at the right-hand edge thereof. The lifting force which was exerted by the coil 20 and the core member 21 is thus broken and the lever arm 19 continues its movement toward the right until the right-hand extremity of the bumper member 66 engages the stop member 68 at the right-hand side of the casing 59. This continued movement results from the momentum attained by the lever arm 19 and the associated parts of the mechanism, and is materially assisted by the extended portion 19ª of the lever arm 19, which is of sufficient weight to have considerable inertia. As the mechanism continues to move to the right of the dead center position, the solenoid core member again moves downwardly until it has returned to its initial position at the time that the lever arm 19 and associated mechanism reach the right-hand extreme position shown in dot-and-dash lines in Fig. 2. In this position it will be seen that the damper 16 lies in a plane parallel to the axis of the outtake conduit 13 of the ventilating system, so that said damper has substantially no effect in obstructing the flow of air through said conduit.

When the temperature again falls to the point at which it is desired to close the damper 16, which point is shown by way of example in Fig. 4 as 45°, the switches 34 and 35 are returned to the positions shown in Fig. 1 in which the circuit of the solenoid coil 20 is again completed. In this instance the energizing circuit of the solenoid coil extends through the switch 34 and the contact plate 26 to the movable contact member 23, but is otherwise the same as above described. Under these conditions the solenoid core member 21 is again raised and the lever arm 19 is accelerated toward its left-hand position until it reaches dead center position, at which time energization of the coil 20 is interrupted by the movement of the movable contact member 23 beyond the left-hand edge of the contact plate 26, and the remainder of the movement of the damper mechanism to closed position is accomplished by the momentum of the parts moving in the opposite direction from that first described.

From the above it will be seen that the two oppositely disposed switches 34 and 35 are respectively connected with the contact plates 26 and 25 of the damper operating mechanism in such manner that the damper is automatically moved from either of its two operative positions to the other in response to energization of the coil 20. Such energization is of momentary duration only, as it is automatically interrupted in the manner described as soon as the damper mechanism reaches its dead center position.

If the temperature continues to fall after the damper 16 is closed to such an extent that there is danger of the freezing point being reached, the thermostatic device 32 will function to open the switch 50. This point is shown by way of example in Fig. 4 as being at 37°. If this condition occurs, the motor 15 is deenergized by the opening of the switch 50, which is connected directly in circuit between the supply conductors and the said motor. The operation of the fan 14 is thus stopped and no further flow of air through the building or room to be ventilated will occur until the temperature rises again. In barns and similar buildings which are well constructed and insulated against heat losses according to modern standards, the heat given off by the livestock housed in the buildings will soon raise the temperature to such a value that the danger of freezing is no longer imminent and the fan may then be safely restarted. In some cases it may be necessary to provide a supplementary source of artificial heat to protect against freezing in extremely cold weather.

When the temperature rises substantially above the point at which operation of the fan is stopped, for example, to 41°. as indicated in Fig. 4, the switch 50 is reclosed, thus completing the circuit of the motor 15 to cause the operation of the fan 14 to be resumed.

In the normal operation of the system the fan 14 will be in operation at all times except for short periods during extremely cold weather. Where the system has been properly designed in view of the size of the space to be ventilated and the number and character of the animals to be housed therein, the damper 16 will be alternately closed and opened in accordance with temperature variations, so that the inside temperature and humidity can be maintained within the desired limits quite accurately. In the event that the outside temperature falls so low that the fan has to be stopped, the interval of shutdown will not be sufficient to permit condensation and accumulation of moisture within the building and the ventilating ducts will not take place. This is a very important feature of the invention in maintaining the proper conditions of humidity and temperature for the best effect upon the health of the livestock housed in the building. It is also of great importance because the prevention of the accumulation of moisture in the ventilating ducts by reason of the substantially continuous and comparatively rapid flow of air therethrough eliminates excessive frosting of said ducts, and thereby does away with the necessity for carefully insulating the metal pipes which are ordinarily used for this purpose. Such insulation is quite expensive and the elimination thereof materially reduces the expense of the installation.

From the foregoing description it will be seen that the present invention provides new and useful means for automatically ventilating barns and other animal shelter buildings, which involve many advantages not heretofore obtained. It is to be understood that the invention is not limited to the particular details of construction and arrangement herein disclosed, as various changes and modifications may be made therein without departing from the spirit and scope of the invention. For example, the damper operating mechanism need not utilize an operating magnet of the solenoid type, but may comprise a magnet having a fixed core member and a cooperating armature; the switches and thermostatic element of the control devices 31 and 32 need not be of the type disclosed, but may be of any other suitable character; and various other details of construction and arrangement of parts, as well as circuit connections, may be provided to suit any particular condition.

What is claimed and is desired to secure by Letters Patent, therefore, is:

1. In a system for ventilating an enclosed space, a power-driven fan for circulating air through said space, means for controlling the rate of circulation independently of the operation of the fan, and two temperature-responsive devices located in the said enclosed space and respectively arranged to control the operation of said controlling means and said fan under different predetermined temperature conditions.

2. In a system for ventilating an enclosed space, a power-driven fan for circulating air through said space, means for controlling the rate of circulation independently of the operation of the fan, and two temperature-responsive devices located in the said enclosed space, one of said devices effecting actuation of said circulation-controlling means to increase and decrease the rate of circulation at the respective limits of a predetermined temperature range, and the other of said devices being arranged to start and stop the operation of said fan at the respective limits of another predetermined temperature range.

3. In a system for ventilating an enclosed space, a power-driven fan for circulating air through said space, means for controlling the rate of circulation independently of the operation of the fan, and two temperature-responsive devices located in the said enclosed space, one of said devices effecting actuation of said circulation-controlling means to decrease the rate of circulation when the temperature falls to a predetermined value and to increase such rate when the temperature rises to a predetermined value, and the other of said devices being arranged to maintain the operation of said fan under normal conditions but to stop such operation when the temperature falls to a predetermined value.

4. In a system for ventilating an enclosed space, a power-driven fan for circulating air through said space, means for controlling the rate of circulation independently of the operation of the fan, and two temperature-responsive devices located in the said enclosed space, one of said devices effecting actuation of said circulation-controlling means to decrease the rate of circulation when the temperature falls to a predetermined value and to increase such rate when the temperature rises to a predetermined value, and the other of said devices being arranged to maintain the operation of said fan under normal conditions but to stop such operation when the temperature falls to a predetermined value, which is less than said first-mentioned predetermined value.

5. In a system for ventilating an enclosed space, a power-driven fan for circulating air through said space, means for controlling the rate of circulation independently of the operation of the fan, and two temperature-responsive devices located in the said enclosed space, one of said devices effecting actuation of said circulation-controlling means to decrease the rate of circulation when the temperature falls to a predetermined value and to increase such rate when the temperature rises to a predetermined value, and the other of said devices being arranged to maintain the operation of said fan under normal conditions but to stop such operation when the temperature falls to a predetermined value, which is less than said first-mentioned predetermined value, and to cause such operation to be resumed when the temperature rises to a predetermined value between the temperature at which the operation of the fan is stopped and that at which said circulation-controlling means are actuated to increase the rate of circulation.

6. In a system for ventilating an enclosed space, a power-driven fan for circulating air through said space, a damper for decreasing the rate of circulation produced by the fan, and two temperature-responsive devices located in the said enclosed space and respectively arranged to control the operation of said damper and said fan under different predetermined temperature conditions.

7. In a system for ventilating an enclosed space, a power-driven fan for circulating air through said space, a damper for decreasing the rate of circulation produced by the fan, and two temperature-responsive devices located in the said enclosed space, one of said devices effecting closing and opening of said damper at the respective limits of a predetermined temperature range, and the other of said devices being arranged to start and stop the operation of said fan at the respective limits of another predetermined temperature range.

8. In a system for ventilating an enclosed space, a power-driven fan for circulating air through said space, a damper for decreasing the rate of circulation produced by the fan, and two temperature-responsive devices located in the said enclosed space, one of said devices effecting closing of said damper to decrease the rate of circulation when the temperature falls to a predetermined value and opening of said damper to increase such rate when the temperature rises to a predetermined value, and the other of said devices being arranged to maintain the operation of said fan under normal conditions but to stop such operation when the temperature falls to a predetermined value.

9. In a system for ventilating an enclosed space, a power-driven fan for circulating air through said space, a damper for decreasing the rate of circulation produced by the fan, and two temperature-responsive devices located in the said enclosed space, one of said devices effecting closing of said damper to decrease the rate of circulation when the temperature falls to a predetermined value and opening of said damper to increase such rate when the temperature rises to a predetermined value, and the other of said devices being arranged to maintain the operation of said fan under normal conditions but to stop such operation when the temperature falls to a predetermined value, which is less than said first-mentioned predetermined value.

10. In a system for ventilating an enclosed space, a power-driven fan for circulating air through said space, a damper for decreasing the rate of circulation produced by the fan, and two temperature-responsive devices located in the said enclosed space, one of said devices effecting closing of said damper to decrease the rate of circulation when the temperature falls to a predetermined value and opening of said damper to increase such rate when the temperature rises to a predetermined value, and the other of said devices being arranged to maintain the operation of said fan under normal conditions but to stop such operation when the temperature falls to a predetermined value, which is less than said first-mentioned predetermined value, and to cause such operation to be resumed when the temperature rises to a predetermined value between the temperature at which the operation of the fan is stopped and that at which the damper is opened.

11. In a system for ventilating an enclosed space, a fan for circulating air through said space, an electric motor for driving said fan, a damper for decreasing the rate of circulation produced by the fan, electromagnetic means for operating said damper, and two temperature-responsive electric switching devices located in the said enclosed space and respectively arranged to control the operation of said electromagnetic means and said electric motor under different predetermined temperature conditions.

12. In a system for ventilating an enclosed space, a fan for circulating air through said space, an electric motor for driving said fan, a damper for decreasing the rate of circulation produced by the fan, electomagnetic means for operating said damper, and two temperature-responsive electric switching devices located in the said enclosed space, one of said devices effecting energization of said electromagnetic means to close and open said damper at the respective limits of a predetermined temperature range, and the other of said devices being arranged to effect energization and deenergization of said electric motor at the respective limits of another predetermined temperature range.

13. In a system for ventilating an enclosed space, a fan for circulating air through said space, an electric motor for driving said fan, a damper for decreasing the rate of circulation produced by the fan, electromagnetic means for operating said damper, and two temperature-responsive electric switching devices located in the said enclosed space, one of said devices effecting energization of said electromagnetic means to close said damper to decrease the rate of circulation when the temperature falls to a predetermined value and to open said damper to increase such rate when the temperature rises to a predetermined value, and the other of said devices being arranged to maintain energization of said electric motor under normal conditions but to deenergize the same to stop the fan when the temperature falls to a predetermined value.

14. In a system for ventilating an enclosed space, a fan for circulating air through said space, an electric motor for driving said fan, a damper for decreasing the rate of circulation produced by the fan, electromagnetic means for operating said damper, and two temperature-responsive electric switching devices located in the said enclosed space, one of said devices effecting energization of said electromagnetic means to close said damper to decrease the rate of circulation when the temperature falls to a predetermined value and to open said damper to increase such rate when the temperature rises to a predetermined value, and the other of said devices being arranged to maintain energization of said electric motor under normal conditions but to deenergize the same to stop the fan when the temperature falls to a predetermined value, which is less than said first-mentioned predetermined value.

15. In a system for ventilating an enclosed space, a fan for circulating air through said space, an electric motor for driving said fan, a damper for decreasing the rate of circulation produced by the fan, electromagnetic means for operating said damper, and two temperature-responsive electric switching devices located in the said enclosed space, one of said devices effecting energization of said electromagnetic means to close said damper to decrease the rate of circulation when the temperature falls to a predetermined value and to open said damper to increase such rate when the temperature rises to a predetermined value, and the other of said devices being arranged to maintain energization of said electric motor under normal conditions but to deenergize the same to stop the fan when the temperature falls to a predetermined value, which is less than said first-mentioned predetermined value, and to cause it to be reenergized when the temperature rises to a predetermined value between the temperature at which the operation of the fan is stopped and that at which the damper is opened.

16. In a system for ventilating an enclosed space, a fan for circulating air through said space, an electric motor for driving said fan, a damper for decreasing the rate of circulation produced by the fan, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and two temperature-responsive electric switching devices located in the said enclosed space and respectively arranged to control the operation of said electromagnetic means and said electric motor under different predetermined temperature conditions, one of said devices comprising two sets of contacts, each of which is opened when the other is closed, respectively connected to said two circuit branches to transfer the energizing circuit for said coil from one of said branches to the other at each limit of a predetermined temperature range.

17. In a system for ventilating an enclosed space, a fan for circulating air through said space, an electric motor for driving said fan, a damper for decreasing the rate of circulation produced by the fan, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and two temperature-responsive electric switching devices located in the said enclosed space, one of said devices comprising two sets of contacts, each of which is opened when the other is closed, respectively connected to said two circuit branches to transfer the energizing circuit for said coil from one of said branches to the other at each limit of a predetermined temperature range, and the other of said devices being arranged to effect energization and deenergization of said electric motor at the respective limits of another predetermined temperature range.

18. In a system for ventilating an enclosed space, a fan for circulating air through said space, an electric motor for driving said fan, a damper for decreasing the rate of circulation produced by the fan, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and two temperature-responsive electric switching devices located in the said enclosed space, one of said devices comprising two sets of contacts, each of which is opened when the other is closed, respectively connected to said two circuit branches to transfer the energizing circuit for said coil from one of said branches to the other at each limit of a predetermined temperature range, whereby said damper is closed to decrease the rate of circulation when the temperature falls to a predetermined value and is opened to increase such rate when the temperature rises to a predetermined value, and the other of said devices being arranged to maintain energization of said electric motor under normal conditions but to deenergize the same to stop the fan when the temperature falls to a predetermined value.

19. In a system for ventilating an enclosed space, a fan for circulating air through said space, an electric motor for driving said fan, a damper for decreasing the rate of circulation produced by the fan, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and two temperature-responsive electric switching devices located in the said enclosed space, one of said devices comprising two sets of contacts, each of which is opened when the other is closed, respectively connected to said two circuit branches to transfer the energizing circuit for said coil from one of said branches to the other at each limit of a predetermined temperature range, whereby said damper is closed to decrease the rate of circulation when the temperture falls to a predetermined value and is opened to increase such rate when the temperature rises to a predetermined value, and the other of said devices being arranged to maintain energization of said electric motor under normal conditions but to deenergize the same to stop the fan when the temperature falls to a predetermined value, which is less than said first-mentioned predetermined value.

20. In a system for ventilating an enclosed space, a fan for circulating air through said space, an electric motor for driving said fan, a damper for decreasing the rate of circulation produced by the fan, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and two temperature-responsive electric switching devices located in the said enclosed space, one of said devices comprising two sets of contacts, each of which is opened when the other is closed, respectively connected to said two circuit branches to transfer the energizing circuit for said coil from one of said branches to the other at each limit of a predetermined temperature range, whereby said damper is closed to decrease the rate of circulation when the temperature falls to a predetermined value and is opened to increase such rate when the temperature rises to a predetermined value, and the other of said devices being arranged to maintain energization of said electric motor under normal conditions but to deenergize the same to stop the fan when the temperature falls to a predetermined value, which is less than said first-mentioned predetermined value, and to cause it to be reenergized when the temperature rises to a predetermined value between the temperature at which the operation of the fan is stopped and that at which the damper is opened.

21. In a system for ventilating an enclosed space, means for causing circulation of air through said space, a damper for controlling the rate of such circulation, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and a temperature-responsive electric switching device located in the said enclosed space and comprising two sets of contacts, each of which is opened when the other is closed, respectively connected to said two circuit branches to transfer the energizing circuit for said coil from one of said branches to the other at each limit of a predetermined temperature range.

22. In a system for ventilating an enclosed space, a means for causing circulation of air through said space, a damper for controlling the rate of such circulation, electromagnetic means for operating said damper comprising a magnet coil and associated mechanism adapted to actuate said damper from either of two operative positions to the other upon momentary energization of said coil, an energizing circuit for said coil comprising two branches adapted to be individually connected in circuit with said coil, electric contact mechanism associated with said damper for transferring the energizing circuit for said coil from one of said circuit branches to the other when the damper is operated, and a temperature-responsive electric switching device located in the said enclosed space and comprising two sets of contacts, each of which is opened when the other is closed, respectively connected to said two circuit branches to transfer the energizing circuit for said coil from one of said branches to the other at each limit of a predetermined temperature range, whereby said damper is closed to decrease the rate of circulation when the temperature falls to a predetermined value and is opened to increase such rate when the temperature rises to a predetermined value.

In witness whereof, we have hereunto subscribed our names.
CHARLES A. MARSH.
JAMES L. STRAHAN.
ALBERT H. NELLER.